Inventors
KURT RANTSCH
ADOLF WEYRAUCH
OTTO TROTSCHER
OTTO AMBROSIUS

By Toulmin & Toulmin
Attorneys

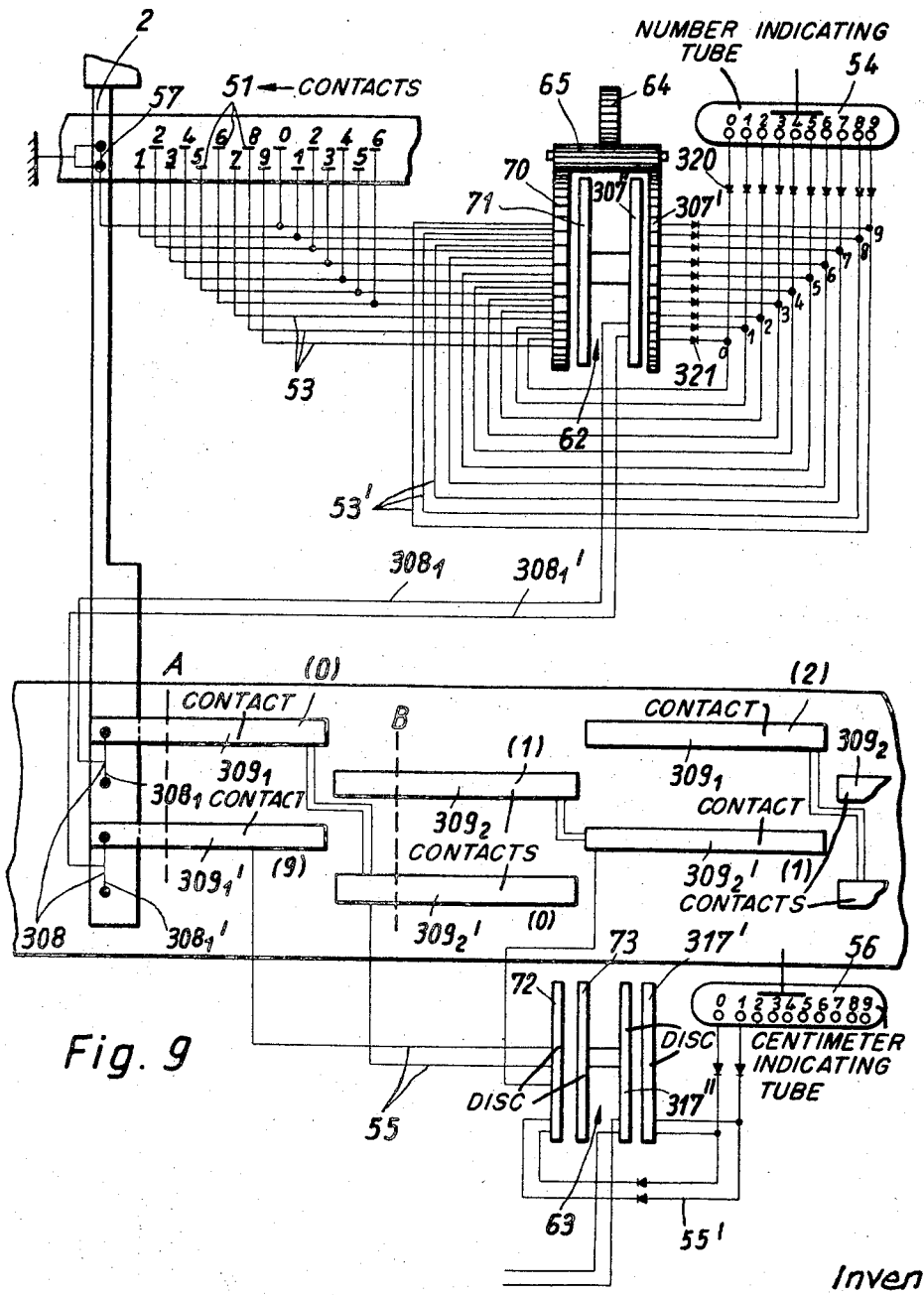

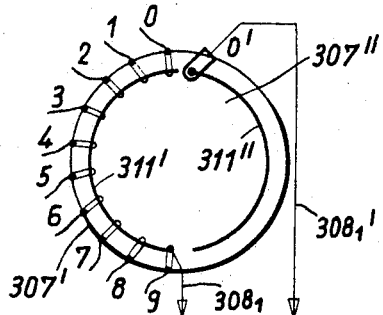
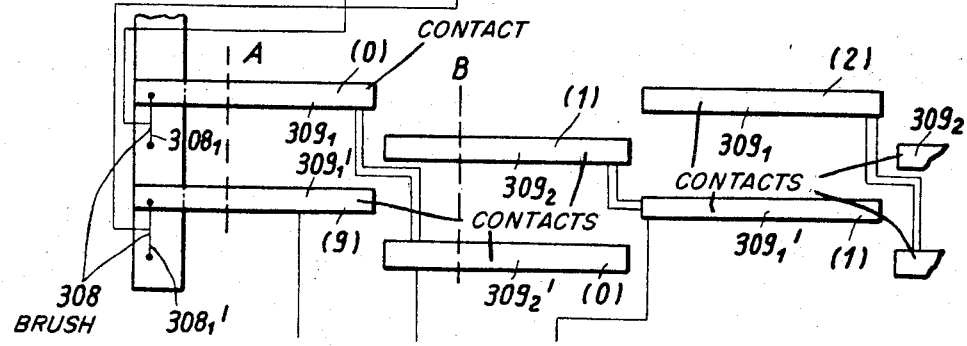
Fig. 11
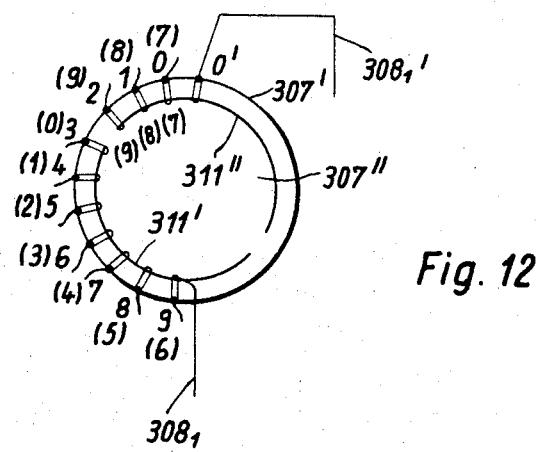
Fig. 12

United States Patent Office 3,405,257
Patented Oct. 8, 1968

3,405,257
CORRECTION INDICATING DEVICE FOR THE TILT OF A SLIDING CARRIAGE OF A TOOL HOLDER
Kurt Rantsch, Adolf Weyrauch, and Otto Trotscher, Wetzlar, Lahn, and Otto Ambrosius, Oberbiel, near Wetzlar, Germany, assignors to Carl Zeiss-Stiftung, doing business as Carl Zeiss Heidenheim on the Brenz, Wurttemberg, Germany, a corporation of Germany
Filed May 18, 1964, Ser. No. 395,105
Claims priority, application Germany, May 18, 1963, H 49,215
33 Claims. (Cl. 235—151.11)

ABSTRACT OF THE DISCLOSURE

An electrically operated correction device for indicating in a machine tool the tilt of a tool holder on a sliding carriage provided with an indicator for indicating the position of the tool holder on said carriage, and correcting means on said carriage to sense the tilting of the tool holder and to produce correction impulses and to act upon said indicator so that the corrected value may be read at said indicator. Adjustable means are provided at the indicator for varying the number of correction impulses so as to adapt the correction device to different heights of the tool holder above a workpiece in the machine.

---

This invention relates to an electrically operated device for determining the magnitude of displacement of a tool holder means which slides along a supporting member.

For example: a drill press may have sliding carriage or head which is slidably mounted on a supporting arm, and the location of the sliding carriage along the arm may be done by location coordinates in known manner so that the tool or drill which depends from the sliding carriage is positioned over the workpiece. In traveling on the supporting member, the sliding carriage tilts and causes the tool to deviate from its intended position on the workpiece. The amount of deviation of the tool at the workpiece increases as the height between the workpiece and the sliding carriage increases.

The object of this invention is to construct a device which will measure the magnitude of the tilting of the sliding carriage on the supporting arm and which indicates the adjustment or correction required.

A further object of this invention is to construct a device which can be incorporated in an existing machine without requiring major revision in the construction of the existing machine.

Prior means for solving the above problem optically do exist. They include means for optically producing an image of a portion of a scale and optically influencing the rays of the image in a corrective manner before the light rays reach a reading scale where the adjustment values are read. Thus the parts are arranged to create an image according to the Eppenstein principle and are shaped accordingly.

Another prior means for making the adjustment for the displacement of the sliding carriage is to physically tilt the upper part of the sliding carriage in an opposite direction. This type of compensation has the disadvantage that it requires a special expensive construction of the sliding carriage which is not always desirable.

There are known means which compensate for the turning of the sliding carriage, especially for the vertical displacement thereof. In one construction, scanning devices are used which sense the displacement and act upon two lead screws which not only drive the sliding carriage but also adjust the position of the carriage by changing the respective r.p.m.'s of the lead screws. This technique understandably requires a special construction of the machine, whereas in applicants' device, the machine construction is not drastically altered but is readily equipped with a measuring device which compensates for the error in the guiding of the carriage.

Accordingly, the device of this invention first of all senses a tilting and/or turning of the sliding carriage and then acts automatically upon the device indicating the displacement to provide the correction adjustment which is read at the device. There are also adjustment means provided on the device which take into consideration the distance between the surface of the workpiece being machined and the plane of measurement from the carriage.

It is known that for a certain angular tilting or displacement of the sliding carriage with a tool depending therefrom, there will be a greater migration of the tool from the measured point at the surface of the workpiece as the distance between the workpiece and measuring point or scale on the carriage increases.

The present invention takes the above into consideration. For example, if the correction device is tilted with the sliding carriage by an angle $u$, and if there are K correction impulses related to this angle $u$ when the distance between the plane of machining and the scale at the sliding carriage is $a$, then one must keep in mind that K correction impulses have already been worked into the result of the measurement. If the distance between the plane of machining and scale at the sliding carriage is now increased to $3a$, then $3K-K=2K$ correction impulses must be added to measured value. As a general rule this does not occur in correction devices in general; however, applicants have provided such means to work in conjunction with the various embodiments of this invention.

In perfecting this invention, it was necessary to construct the correction device so that it could be set to zero at any position of the sliding carriage along its supporting arm in order that corrections for differences in machining heights could be handled.

After the machining height is changed, the correction device is again activated, and for the same tilting angle $u$ of the sliding carriage, the proper correction value for the new height is indicated.

The different modifications of correction devices disclosed in this invention make use of certain elements, such as water level bubbles and optical prisms mounted like pendulums, which are influenced by gravity to determine the tilting of the sliding carriage. There are means provided in this invention to return these elements to their starting positions before the adjustments to machining heights are made.

It is preferred to coordinate the means for zero setting mentioned above with the means for adjusting the machining heights so that the machining heights can be changed only after first making a zero adjustment in the correction device.

There are several types of correction devices disclosed herein. A first type operates according to the analog principle in that it finds the amount of displacement as a function of the displacement path. The indication of the measured value may be made by analog representation or it may be digitally made after the interposition of a suitable analog to digital converter.

In reference to the above paragraph, a water level sensing means may be used to sense the tilting of the sliding carriage and a camber and pivot inclination device may act upon water level sensing means to translate the extent of tilting into a digitally recording device to indicate the extent of correction necessary.

The device of the above paragraph is also improved upon to take into consideration the variations in machining height. This is accomplished by changing the transmission ratio between the water level sensing means and the camber and pivot inclination device. The above is accomplished as follows:

The water level sensing means would also include optical parts which direct reflected light from the bubble to two photo electric cells. As long as the sliding carriage has not tilted, the light intensities in the photo electric cells will be equal.

When the sliding carriage tilts indicating a correction is required, different light intensities will register in the photo electric cells. The camber and pivot inclination device is operatively connected to the optical parts which are between the bubble and the photo electric cells. The camber and pivot inclination device then acts upon the optical parts until equal light intensities are recorded in the photo electric cells and the extent of movement of the optical parts necessary is a measure of the tilting of the sliding carriage.

A follow-up motor can be used to drive the camber and pivot inclination device and if the transmission ratio between the optical parts and the follow-up motor is adjustable, then depending upon the choice of transmission ratio, a different number of r.p.m. of the motor will be needed to act upon the optical parts to restore equal light intensities in the photo electric cells. The transmission ratio is, of course, correlated to the machining height and the number of r.p.m. of the motor fed into the correction device changes with the transmission ratio.

In order to insure that no correction values are lost during the adjustment of the transmission ratio, this invention has been developed so that upon the adjusting of the transmission ratio, the follow-up device (such as a camber and pivot inclination device) becomes actuated in order that the correction device will add the right number of correction units into the measuring device.

As described above, it is preferred that the optical parts which are acted upon by the follow-up device get an additional adjustment when one sets the transmission ratio for changes in machining height. In a special embodiment of this invention, the optical parts are connected to the follow-up device by a lever transmission. There is at least one lever in the lever transmission which may be displaced by adjusting the transmission ratio.

This one lever may have one end connected with the follow-up device which is in a state of rest while the other end is connected to the optical parts which may comprise a tiltable optical plate with parallel surfaces. The one lever would also have a fulcrum which is shiftable and, when the fulcrum is shifted, the optical plate will undergo an additional tilting. The additional tilting will put the following-up device into action to compensate for the tilting and the corresponding corrective values are fed into the indicating device. The shifting of the fulcrum is correlated to the different heights of the sliding carriage above the workpiece or the machining height.

There are several different measuring devices disclosed herein. If the measuring device is an impulse counting device, so that the measured value is indicated in a digital manner, then the correction device preferably supplies the measuring device with digital correction values. The values may be multiplied or divided electrically to suit the particular application.

There are means provided to selectively multiply the impulses furnished by the correction device in one or several stages as follows:

In one embodiment of this invention, the number of correction impulses is multiplied electronically by feeding the impulses into a multivibrator which opens an AND gate for a certain unit of time. The AND gate is connected with an oscillator which releases a number of impulses which are a function of its frequency across this gate to a counter. Because the AND gate is always open when a correction impulse occurs, the correction impulse becomes multiplied by the impulses furnished by the oscillator. Since the frequency of the oscillator can be varied, one can correlate the oscillator frequency with the machining height. For the same tilting angle of the sliding carriage, more correction units would be generated for the greater machining heights.

The above could also be modified to change the time constant of the multivibrator and keep the oscillator frequency constant. In this modification, he machining height would be correlated to the time constant of the multivibrator.

If one requires very high measuring accuracies, it is advantageous to construct the correction device so that it releases a very great number of correction impulses. The number of impulses can then be divided to adapt the correction device to different machining heights. The error in measurement in this construction is not any greater than the error when using the individual correction impulse.

The division of the correction impulses is accomplished through using a counting ring which contains a plurality of transistor stages which are selectively brought into action to screen out the 2nd, 3rd, 4th, etc., impulse.

To effect the selective screening there are a series of flip flop circuits which are switched in series and each arriving impulse is fed into each circuit. The circuits are connected to a pole of a multi-pole switch which connects one of the flip flop circuits with the correction impulse former and a counting device. The specific details for the construction will be explained hereinafter.

As has been mentioned previously, whenever the machining height is changed, care should be taken to insure that none of the correction impulses are lost. Another possibility of insuring this is to have the correction impulses which are furnished by the correction device fed first into a storage unit. After the machining height is adjusted, the impulses are called out of the storage unit and are correspondingly multiplied or divided as stated above.

Also included in this invention are means for numbering the measured values. The means includes brush means on sliding carriage which slide over numbered contacts on the supporting arm of, for example, the drill press mentioned earlier. The means include rotary switches by which the contacts are connected to the cathodes of number indicator tubes to indicate the position of the sliding carriage on the supporting arm.

Included in the above are zero switches in circuit with the cathode leads so that at each position of the sliding carriage on the supporting arm, the number indicator tubes can be made to read zero. To accomplish this, the zero switches reverse the polarity of the cathodes in a suitable manner. The correction devices mentioned earlier will act upon the follow-up device which in turn will also actuate at least one of the zero switches so that the desired correction will be indicated in the number indicator tubes.

The zero switch may consist of at least two discs. One of the discs carries two groups of poles in which there is a first group of read-in poles which are connected to the contacts on the supporting arm in the drill press example given, and the second group or read-out poles is connected to cathodes of the coordinated number indicator tubes. The second disc which may be rotated to effect a zero adjustment carries bridges which connect the read-in group of poles with the group of read-out poles.

The follow-up device such as a camber and pivot inclination device mentioned earlier which works in conjunction with the correction device will also rotate the disc which contains the read-in and read-out poles with the result that the correction values will be indicated in the number indicator tubes. There are suitable means in this construction to insure a proper change-over from the numerals 0 to 9 or from 9 to 0 when changing over to the next higher decimal subdivision in the number indicator tubes. For this purpose, there is a zero switch which has four discs which will be explained in one of the examples. In this construction, it is sufficient for the correction values to be fed into only the zero switch representing values of the lowest decimal subdivision.

Also in this construction, the zero switch and follow-up device are interrelated so that when the transmission ratio (for different machining heights) of the follow-up device is set, the zero switch becomes actuated.

An error in the measurement and/or adjustment of the system disclosed herein may not be caused alone by faulty guiding or operation but may also be caused due to an irregular heating of the machine since the sliding carriage has a motion relative to its supporting member. Such displacement of the sliding carriage can also be noted and accounted for by prior art means as shown in the German Patents 1,077,560 and 1,102,000. In this last named patent, means are disclosed which act upon a follow-up device, such as a camber and pivot inclination device, which itself shifts the sliding carriage by the corrective values so that the influences of temperature are compensated. This additional shifting of the sliding carriage is not necessary.

A further development of this invention is to combine the follow-up device from the prior art means with the correction device of this disclosure, so that the correction units are fed into an adding device which acts as a differential unit so that the net correction value is fed into the indicator for the correction required.

This invention will be described in connection with the following drawings in which:

FIGURE 9 is a schematic view of the zero switch arrangement of this invention;

FIGURE 11 shows details of FIGURE 9 when discs 71 and 307″ are in their normal position;

FIGURE 12 shows details of FIGURE 9 when discs 71 and 307″ are rotated somewhat;

Figure 1:
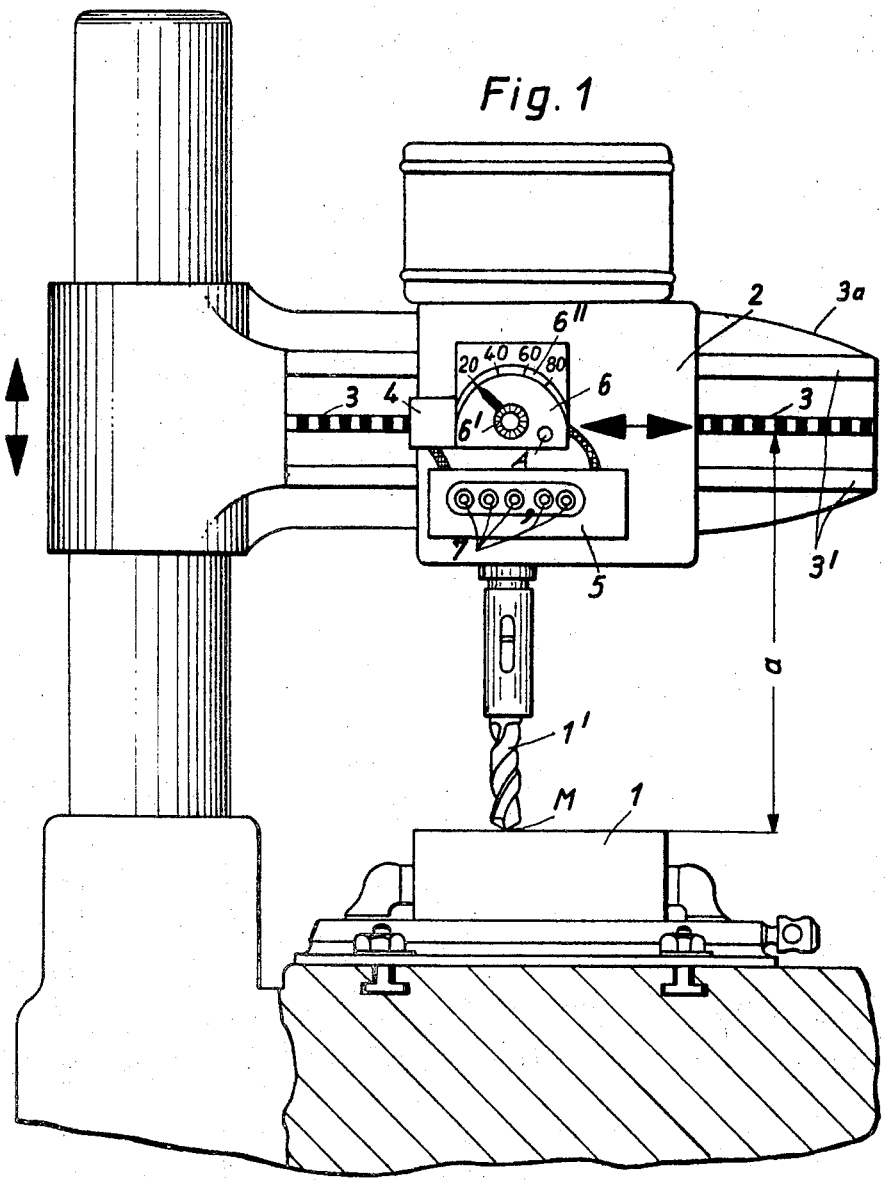
FIGURE 1 shows a typical machine tool into which the device of this invention has been incorporated.

Referring to the drawings in detail, FIGURE 1 shows a general view of a drilling machine utilizing the device of this invention. While a drilling machine is used as the specfic embodiment, it is understood that this invention is adaptable to other machines such as millers, borers, etc. which have a sliding carriage or equivalent members.

The workpiece 1 is shown fixed in position on the base of the drill press, and the drill 1', which is located by coordinates in known manner, is contacting the workpiece at M. The drill 1' depends from the tool holder means or sliding carriage 2 which is moved along guides 3' and scale 3 which is fixed to the supporting arm 3a.

In order to determine how much the sliding carriage 2 has been displaced from the position intended by the setting of the coordinates, there is a scanning member 4 which releases electrical impulses to a registration device 5. Connected to the sliding carriage 2 is a control device 6 which senses by impulses the tiltings and/or turning of the carriage 2 on its supporting member 3a. The correction device 6 supplies correction impulses to the registration device 5 which adds the correction impulses to the measured value and indicates the corrected value in the number indicating tubes 7.

Figure 2:
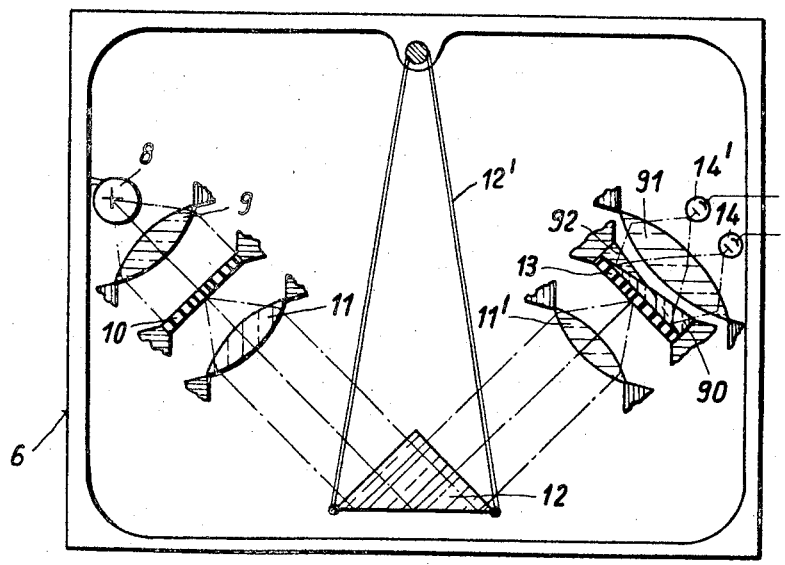
FIGURE 2 is a view of one of the correction devices of this invention.

FIGURE 2 shows a first embodiment of the correction device 6 which is constructed to compensate for the error in measurement which is brought about by the tilting of the sliding carriage 2 around an axis which is vertical to the plane of the drawings of FIGURE 1. Light coming from a source of light 8 passes through a condenser lens 9 and arrives at the optical grating 10. The image of this grating 10 is created through the use of objective lens 11 and 11' and a prism 12 and is brought to bear upon the collecting grating 13.

The prism 12 is suspended by supports 12' to permit it to oscillate freely like a pendulum as the sliding carriage tilts.

The collecting grating 13 has been subdivided and the divisions have been shifted with respect to each other by one line width so as to render possible both forward and forward counting.

There are two optical wedges 90 and 92 positioned behind the grating 13 as shown. An objective lens 91 is positioned behind the optical wedges and in front of the photoelectric cells 14 and 14'. These cells receive light impulses as a result of the tilting of the sliding carriage 2 and in response to the moving away of the image of the grating 10 upon the collecting grating 13.

The image of one portion of the grating 13 is formed by the aid of wedge 90 and lens 91 at photoelectric cell 14 and the image of the other part of the grating is formed by the aid of wedge 92 and lens 91 upon the photoelectric cell 14'. In this manner, light impulses with their correct signs are received in the correction device 6 and these impulses are in turn passed on to the counting device shown schematically in FIGURE 1 where they become the indicated value.

As shown in FIGURE 1, the distance between the machining plane and the scale 3 is $a$. When at $a$, the number of impulses furnished by the correction device 6 compensates exactly for the shifting of a measured point M by the tilting of the sliding carriage 2. When the distance $a$ becomes changed, as when performing an operation on a workpiece which has another height, the correction device will no longer furnish the correct number of impulses since the distance $a$ has been changed.

To compensate for changes in the distance between the scale 3 and the workpiece, there is a rotary knob 6' and a corresponding scale 6″. The knob 6' is set to the appropriate setting for $a$.

Figure 3:
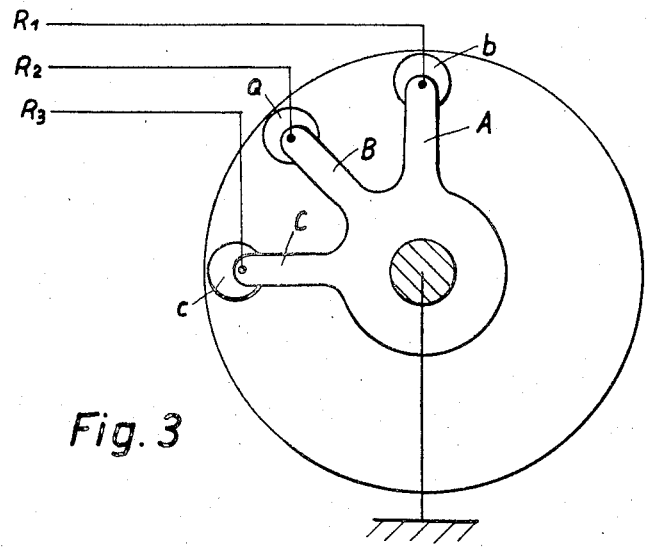
FIGURE 3 is a rotary switch used in connection with the device of FIGURE 4.

The rotary knob 6' actuates the rotary switch 3 shown in FIGURE 3. The switch 3 has three contacts $a$, $b$, and $c$ which are respectively connected to $R_2$, $R_1$ and $R_3$. Three brushes A, B and C which are grounded pass over the contacts, and depending upon the position of rotary knob 6', a current connection will be made to relays $R_1$, $R_2$ and $R_3$.

Figure 4:
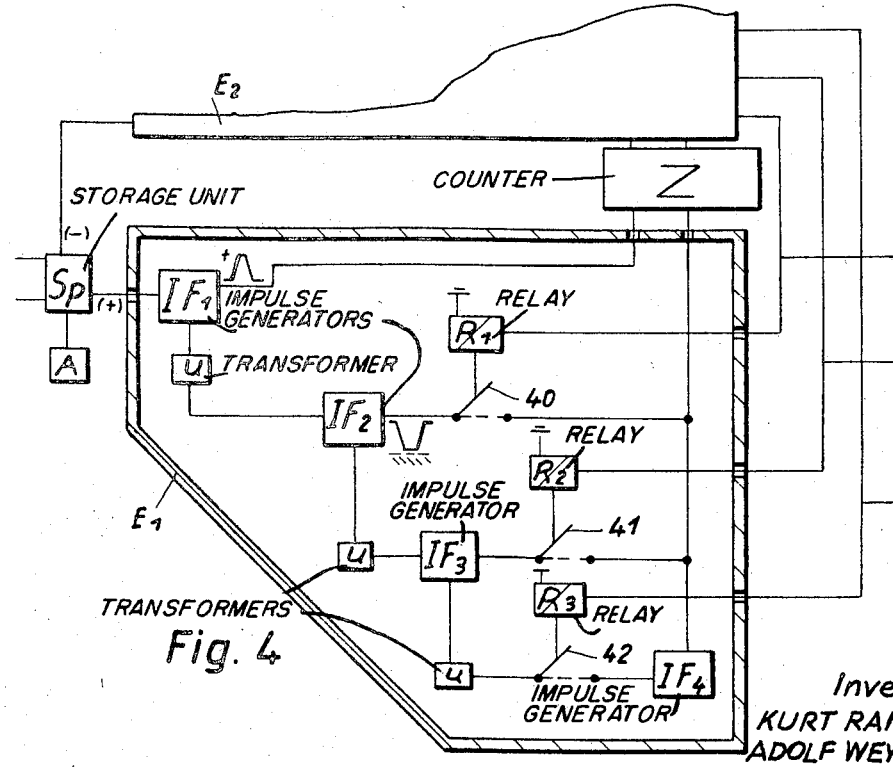
FIGURE 4 is a schematic arrangement for counting impulses obtained from the correction device of FIGURE 2.

The relays $R_1$, $R_2$ and $R_3$ control switches 40, 41 and 42, respectively, of FIGURE 4. The switches 40–42 open and close leads from the impulse generators $IF_2$, $IF_3$ and $IF_4$, respectively, as shown in FIGURE 4.

The device of FIGURE 4 performs in the following manner. An incoming impulse from a device 6, as shown in FIGURE 2, is received at the known storage unit $Sp$ and is fed into impulse generator $IF_1$. The output of this generator is shown as an impulse curve (adjacent to $IF_1$) and the portion of the curve which is drawn as a heavy line represents a positive impulse which will produce one counting step in the counter Z.

The output of the impulse generator IF$_1$ is also connected to a transformer $u$, which causes a reversal of the sign of the impulse. The transformer $u$ then causes a reversal of sign of the impulse and the impulse is fed to impulse generator IF$_2$ from which it is released again, and if switch 40 is closed the impulse will then be routed to counter Z; however, there will be a time lag between the first impulse and the impulse coming from IF$_2$. The right hand of the impulse shown as a heavy line next to IF$_2$ on FIGURE 4 is employed for counting.

The same arrangement is provided for impulse generator IF$_3$ which is connected to the output side of IF$_2$ through a transformer $u$; and a similar arrangement is provided for impulse generator IF$_4$ which is connected to the output side of IF$_3$ through a transformer $u$. Each of these impulses will reach the counter Z only after the released impulses from the preceding stages have arrived and the pertaining switches 40–42 are closed.

If all the switches 40–42 are closed, then the input impulse is delayed with respect to time across all the input generators and accordingly, there will be four impulses registered in counter Z. The opening of one or more of the switches 40–42 will accordingly decrease the number of impulses which arrive at counter Z.

While the arrangement shown in FIGURE 4 indicates only a few stages, it is understood that additional stages may be added to vary the distance $a$ (of the machining plane) over greater values.

As may be recognized from FIGURE 4, the setup E$_1$ has been utilized for counting positive impulses which are provided for counting forward. A setup E$_2$ similar to E$_1$ is used for counting negative impulses which are used for backward counting.

The storage unit Sp shown in FIGURE 4 stores the impulses received from correction device shown in FIGURE 2 without passing them on to counter Z. In a first modification, a knob A shown on FIGURE 1 is actuated after the termination of the displacement of the sliding carriage. Upon actuation, the impulses which have been stored in the storage unit Sp are fed into the counter as previously explained.

A second modification makes it possible to adjust the position of switch 6' (for different machining heights $a$), during the shifting of the sliding carriage 2 without fear of correction impulses being lost. This is accomplished by the arrangement shown in FIGURES 5 and 6.

Figure 5:
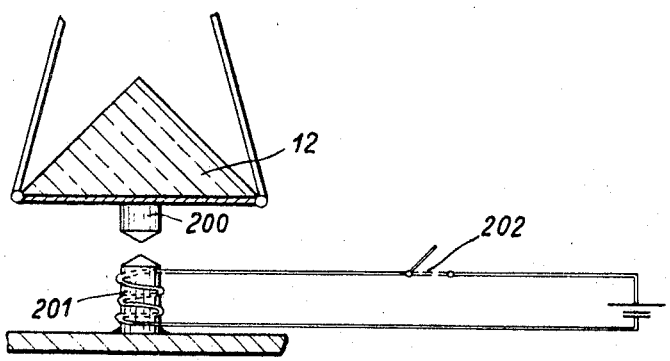
FIGURE 5 shows a different construction of the device of FIGURE 2.

FIGURE 5 shows a prism 12 which is used in a manner similar to the prism shown in FIGURE 2. The prism 12 has been modified to include a peg 200 which is attached to the bottom thereof by known means. There is an electromagnet 201 placed under the zero position of the prism 12 and which magnet is energized by the closing of switch 202.

Switch 202 serves the following purpose: If at any arbitrary position of the sliding carriage one wishes to change the position of the machining height $a$, one first pushes in push-button A shown in FIGURE 6 to close switch 202. Electromagnet 201 will then be energized to attract peg 200 and thereby return prism 12 to its zero position. In this position, the correction value supplied to indicator 5 will be zero which will be an incorrect adjustment value. The machining height $a$ is then adjusted to the desired distance. After adjustment, push-button A is again pushed in to actuate switch 202 which will open and deenergize electromagnet 201, thereby permitting prism 12 to swing freely. The prism 12 will then swing to a position determined by the tilting of the sliding carriage 2.

As the prism swings to position dictated by the tilting of the sliding carriage 2, there are light impulses created in the correction device shown in FIGURE 4, with this exception. Since the prism was permitted to assume a position after the adjustment of the machining plane $a$ was made, there is no chance for impulses to get lost; therefore, the storage device shown in FIGURE 4 is not necessary when using the construction shown in FIGURES 5 and 6.

Figure 6:
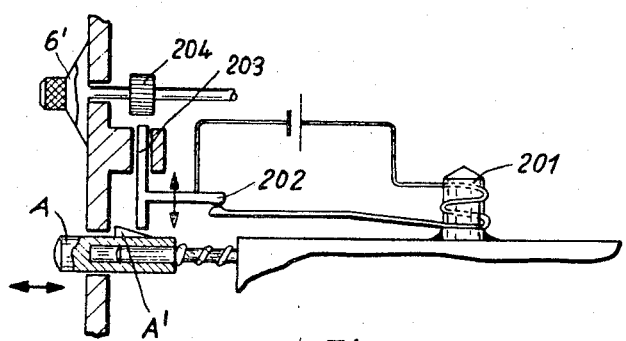
FIGURE 6 shows a construction to insure that the rotary knob 6' is actuated only when prism 12 is in a zero position.

In order to insure that the rotary knob 6' is turned only when the switch 202 energizing the electromagnet 201 is closed, the following construction is provided. As shown in FIGURE 6, upon actuation of push-button A, there is a cam surface A' on A which causes bolt 203 to rise and engage a cogwheel 204 which is fixed to rotate with rotary knob 6'. In rising, bolt 203 opens switch 202 to de-energize electromagnet 201, and also prevents rotary knob 6' from being turned while the electromagnet 201 is de-energized. The rotary knob 6' is unlocked by simply pushing in again on push-button A which has an actuation device similar to the known construction of retractable ball point pens.

Figure 15:
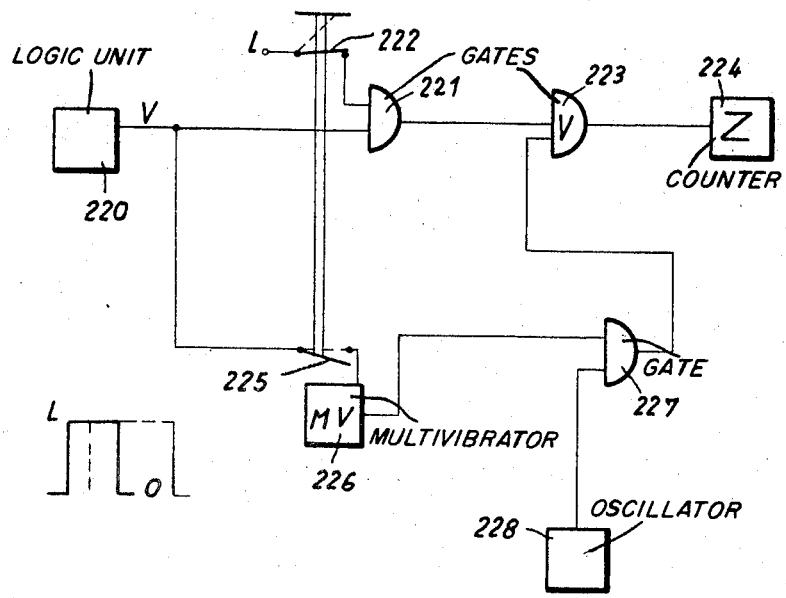
FIGURE 15 shows another construction for the multiplication of correction impulses.

FIGURE 15 shows schematically another device for the multiplication of the correction impulses which come from a logic unit such as that shown in FIGURE 2, for example. From unit 220, the impulses are fed into an AND gate 221 which permits the impulses to pass only when switch 222 is closed. The impulses which were permitted to pass arrive at OR gate 223 and enter counter 224 where the normal number of arriving impulses is counted.

When the normal number of impulses are to be multiplied, switch 222 is opened. Switch 225 is gauged to operate simultaneously with switch 221, and it will close when switch 221 is opened. When switch 221 is opened, AND gate 221 does not permit the passage of the impulses to the counter 224; however, the impulses reach multivibrator 226, which itself opens an AND gate 207 for a short time interval, which is a function of its time constant. During the time which the AND gate 227 is open, impulses which are continuously generated by an oscillator 228 pass through the AND gate 227 and are fed to the counter 224 across the OR gate 223.

The time constant of the multivibrator 226 is adjustable so that the number of impulses admitted through the AND gate 227 may be adjusted as a function of the machining height $a$.

As an alternate construction the frequency of the oscillator 228 may be adjustable so as to generate varying frequencies of impulses which can be correlated to the machining height $a$ while the time constant of the multivibrator 226 is kept constant.

Figure 13:
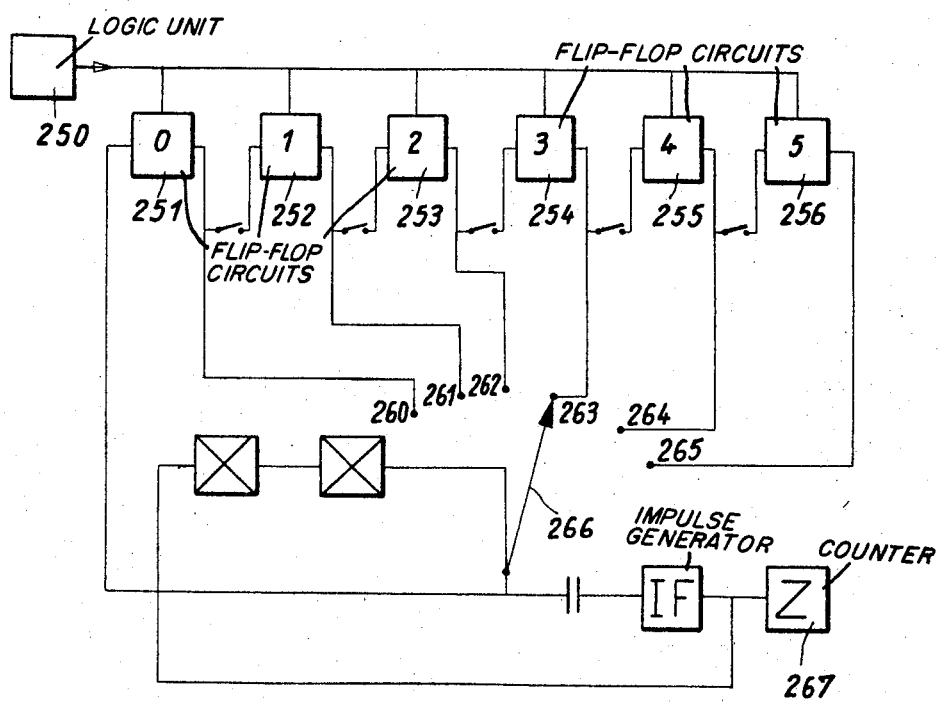
FIGURE 13 shows a construction in which the correction impulses are divided as a function of the machining height.

FIGURE 13 is a schematic diagram of a construction in which the number of correction impulses is divided as a function of the machining height $a$.

In this construction, there are a series of flip flop circuits 251 to 256. The impulses arriving from the logic unit 250 are fed into each of the above circuits 251 to 256. The incoming impulse is forwarded to the next flip flop circuit only when the preceding circuit is prepared for this. For this reason one may say that stage 251 serves for the counting of zero impulses, i.e., for the preparation of all subsequent stages, the stage 252 serves for the counting of the first impulse, and the stage 253 serves for the counting of the third impulse, etc.

The output sides of the stages 251 to 256 are connected to the poles 260 to 265 of a switch 266. In the position shown in FIGURE 13, the third impulse which leaves from stage 254 is fed into an impulse generator (modifier) IF and into a counter 267 which is connected at the output side thereof. In the described device, at the first impulse, the third input impulse is registered, but at each subsequent passage; however, each fourth impulse is registered, i.e., the arriving impulses are divided by four with an error of one impulse. If the switch is turned to another position, the arriving impulses become divided by three or by five, etc.

Figure 14:
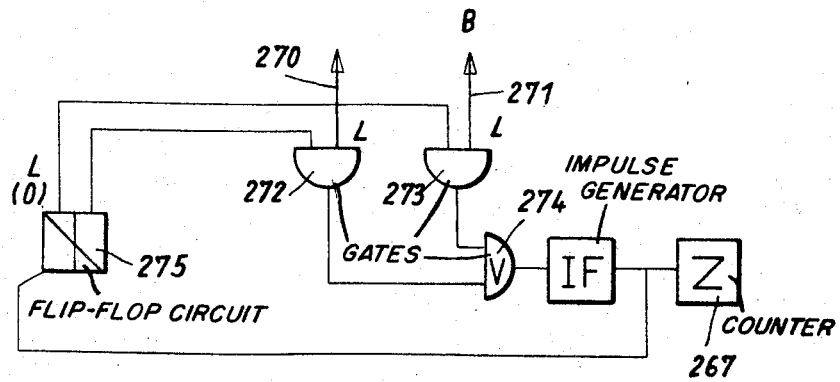
FIGURE 14 shows a modification of the construction of FIGURE 13.

Since the stages 251 cannot be omitted for the creation of the starting base, a switch construction according to FIGURE 14 may be devised to insure that the first impulse is not lost. The switch 270 and 271 of FIGURE 14 is constructed as a double switch. These individual switches forward the received impulses to the AND gates 272 and 273. The AND gates are connected across an OR gate 274 from where the impulse is sent to an impulse generator IF and then to the counter 267.

The impulse generator IF controls another flip flop circuit 275 which itself controls the AND gates 272 and 273 in this manner. At the outset of the counting, the AND gate 273 will let the third impulse pass and at further counting across the switch 270 and the AND gate 272, and further third impulse is counted.

Figure 7:
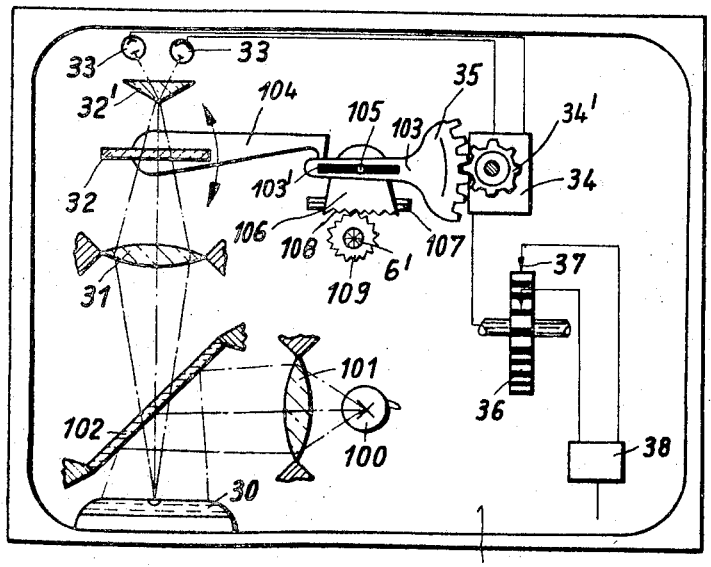
FIGURE 7 is another modification of the correction device with follow-up means incorporated therein.

FIGURE 7 shows schematically a different modification of the correction device 6. In this construction there is a liquid level 30 which is illuminated from a light source 100 through the condenser lens 101 and a mirror 102 having a portion which is transparent to permit the light rays to travel therethrough as shown.

The image of the bubble in the liquid level 30 is formed at the edge of the double prism 32' as shown by the use of an objective lens 31 and a transparent plate 32 having parallel sides, which plate can be tilted in the direction shown by arrow adjacent thereto.

Located behind prism 32' are two photo-electric cells 33 which receive the reflected light from the bubble in the level 30. As the sliding carriage 2 tilts, the bubble leaves its central position and causes the cells 33 to be energized with light of different intensities.

The photoelectric cells 33 are connected to a follow-up device 34 which they control. The device 34 may be a camber and pivot inclination device which will tilt plate 32 until light intensities received by the cells 33 will be equal. While this follow-up device is mechanical in nature, it is understood that purely electrical follow-up devices may be employed depending upon the specific embodiment.

The tilting of the plate 32 is accomplished as follows: The device 34 has a driving gear member 34' which meshes with a gear portion 35 on lever 103. Lever 103 has a slot 103' therein in which bolt 105 may be slidingly moved. Bolt 105 is mounted in a support member 106 which may be shifted laterally in grooved guide 107. Lever 104 is operatively connected to lever 103 at one end as shown and the other end of lever 104 supports plate 32. As the lever 103 is driven by gear 34' the plate 32 will be tilted in response to the actuation of the photoelectric cells 33.

The follow-up device 34 is also operatively connected with the collector disc 36 which rotates in response thereto. There are brush means 37 to collect the impulses from the collector disc as it rotates, and the impulses are forwarded to the counter 38.

In order to have the correction device 6 of FIGURE 7 be adaptable to changes in the machine height a, the support member 106 has a toothed rack 108 along its lower edge. This rack 108 is in mesh with a gear 109 which rotates with the setting of rotary knob 6'.

Upon turning rotary knob 6' to adjust for different machining heights a, the bolt 105 is shifted in slot 103. This changes the transmission ratio of the linkage between the follow-up device 34 and the plate 32. The transmission ratio is then correlated to the various machining heights a and for the same tilting angle of plate 32, the collector disc 36 will undergo a different extent of rotation which is a function of the position of bolt 105 in slotted hole 103.

The device described has the following advantage:

Let us assume that the sliding carriage 2 is in the position x units of length, and that in this position the correction device has added y units of correction length to the value, then in the indicator tubes 7 the value $x+y$ will be indicated. This value corresponds to the operating distance a. If now the operation distance is changed to the value $a_1=2a$, then the correct measured value will be $x+2y$. But this value will be indicated by the tubes 7 then only when at the setting of the operational distance $a_1$ the y correction impulses have become transformed into 2y correction impulses. This will occur automatically by the device described. The y correction impulses correspond namely to a certain tilting angle of the plate 32, and therefore correspond to a corresponding tilting of the levers 103 and 104.

If the bolt 105 is shifted in guide 107 so as to set the operational distance a, then the slopes of the levers 103 and 104 become changed as well as the ones of the plate 32 having the parallel surfaces. This means that the image of the bubble in the water level becomes moved, and the follow-up device 34 (camber and pivot inclination device) becomes actuated until additional y correction impulses have been fed into the counter installation 38. This represents an analog to digital conversion.

Figure 8:
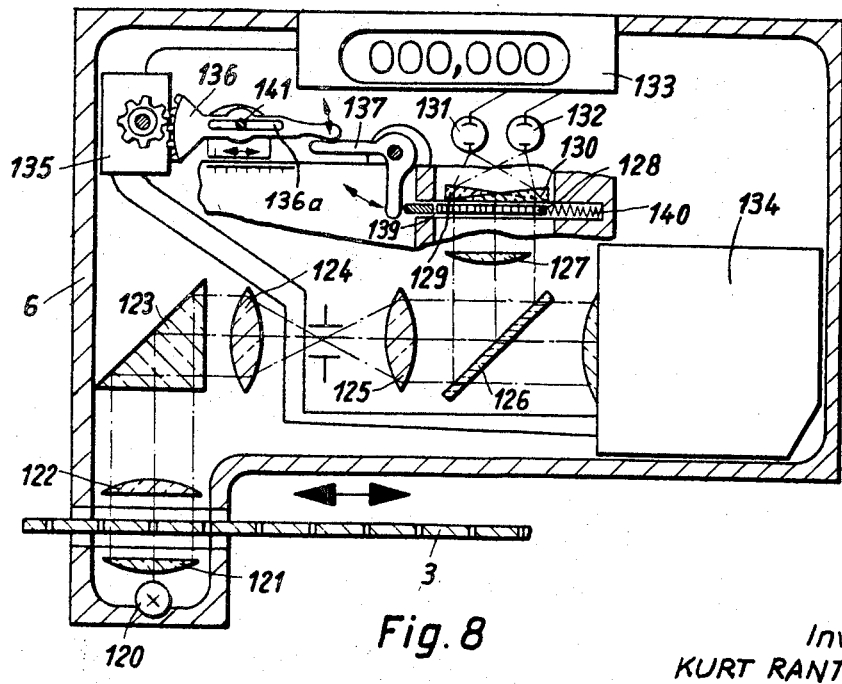
FIGURE 8 is yet another modification of the correction device with follow-up means incorporated therein.

FIGURE 8 schematically shows a similar device. The reading setup 6 again may be shifted together with the sliding carriage 2 along the scale 3. This scale 3 is illuminated by aid of a light source 120 of transparent light and a condenser lens 121. From the scale which appears underneath the objective 122 an image is formed upon a ruled plate, i.e., optical grating 128 through the aid of a prism 123 and two lenses 124 and 125, with the interposition of a partially transparent mirror 126 and another lens 127. Behind this optical grating 128 two optical wedges 129 and 130 have been positioned, as shown, to guide the light which passes through the grating 128 to the photoelectric cells 131 and 132. The photoelectric cells 131 and 132 control a counting setup 133.

An inclinometer 134 which may be constructed as the one in FIGURE 7 is also included in the device of FIGURE 8. This inclinometer 134 controls a follow-up device 135 which may be a camber and pivot inclination device. The device 135 has levers 136 and 137 which are operatively connected to displace the optical grating 128 which is mounted to be shifted laterally inside guide 139 against the pressure of spring 140.

The displacement of grating 128 creates additional impulses which are registered in counting device 133 as correction impulses. The bolt 141 of lever 136 is shiftable inside the slotted hole 136a to change the transmission ratio of the linkage between the follow-up device 135 and the grating 128 as was generally done in connection with FIGURE 7. The shifting of bolt 141 would be operationally connected to rotary knob 6' of FIGURE 1 to provide for different machining heights a, as previously explained.

FIGURES 9–12 show a typical example as to how the correction devices mentioned above are coordinated with the number indicating tubes 7 shown in FIGURE 1.

The scale 3 shown in FIGURE 1 is subdivided into a series of contacts 51 which are spaced apart at distances of 1 mm. each. The contacts 51 are staggered as shown in FIGURE 9 to prevent the spaces between contacts from being clogged with foreign material as the sliding carriage 2 slides thereacross.

In addition to the millimeter contacts, there are also provided centimeter contacts $309_1$ and $309_2$ and a corresponding row of centimeter contacts $309_1'$ and $309_2'$. The centimeter contacts designed (0), (1), (2), etc., are staggered with respect to each other to prevent accumulation of material between contacts as previously explained. The staggered contacts are connected as shown in FIGURE 9 with the 0's, 1's, 2's, etc., of contacts 51 being connected to each other as shown.

Figure 10:
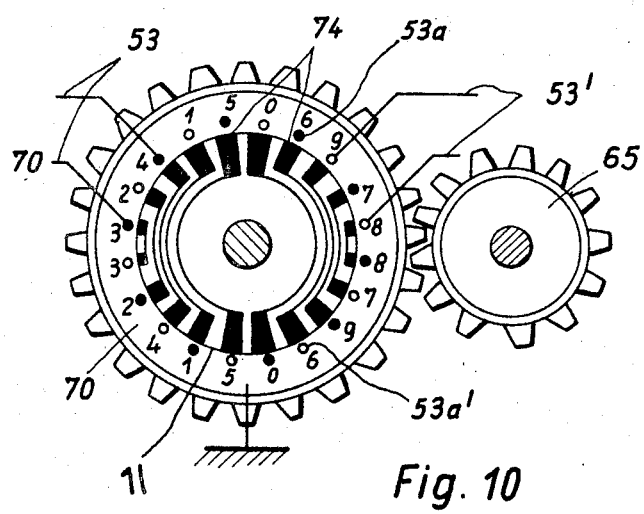
FIGURE 10 shows details of discs 70 and 71 of FIGURE 9.

Disc 70 shown in FIGURES 9 and 10 has two sets of poles. It has a read-in group of poles represented by the numbers 0 to 9 which have a solid dot next to them as shown in FIGURE 10. It also has a group of read-out poles which are represented by the numbers 0 to 9 which each have a small circle next to them.

Leads 53 connect the contacts 51 with the pertaining group of read-in poles on disc 70 and leads 53' connect the read-out group of poles 0 to 9 with the pertaining cathode of a number indicating tube 54 for indicating the position of the sliding carriage 2 along supporting arm 3a.

To connect the read-in poles with the read-out poles the following construction is used. Disc 70 shown in FIGURES 9 and 10 operates in conjunction with a zero switch 62 whose purpose will be subsequently described. Zero switch 62 has two discs 71 and 307" which are connected to rotate together as shown in FIGURE 9. Disc 71 has a plurality of bridges 74 thereon which connect the group of read-in poles with the group of corresponding read-out poles when the disc 71 is in the normal position shown in FIGURE 10. Thus an electrical pulse arriving at read-in pole 6 along lead 53a will travel across the pertaining bridge means 74 and leave read-out pole 6 via lead 53a'. The pulse arrives at pole 6 when brush means 57 on sliding carriage 2 travels across the pertaining contact 51.

However, if the disc 71 is rotated for the purpose of zero setting to be later described, the read-in values may be changed by the bridge means 74. For example, if the disc 71 shown in FIGURE 10 is rotated three positions in a clockwise direction, a value which is read into disc 70 as a "three" will be read out as a "zero" to the millimeter indicator tube 54. Thus, if the sliding carriage 2 is positioned at a contact 3 of contacts 51, the millimeter tube 54 would normally indicate "3." However, if one rotates disc 71 of zero switch 62 the appropriate number of positions, the tube 54 can be made to read "zero."

In addition to being connected to read-out tube 54, the leads 53a are also connected to disc 307', whose purpose will be later described.

Leads 55 appearing in the lower portion of FIGURE 9 connect the individual centimeter contacts 309 with disc 72 of the zero switch generally designated 62. Disc 72 has read-in poles and read-out poles similar to those previously explained in connection with disc 70. Disc 73 also carried bridge 74 which also are similar to those already explained in connection with disc 70. From disc 72, there are leads 55' which connect the read-out poles with the pertaining cathode in the centimeter indicator tube 56. The leads 55' are also connected to contacts on disc 317" whose purpose is similar to disc 307'.

Brushes 57 and 308 are connected with the sliding carriage 2 shown in FIGURE 2 and slide over the contacts 51 and 309, respectively. In sliding over the contacts, the brushes 57 and 308 place a voltage to one of the contacts of the row 51 and 309, respectively, so that a corresponding value will light up in the indicator tubes 54 and 56, respectively.

There are two sets of centimeter contacts as shown in FIGURE 9, which are used in connection with zero switch 62 to insure the proper indication of numerical values in the tube 56 during the change of the numerals "0" and "9" in the indicator tube 54.

In using the arrangement shown in FIGURES 9 and 11 assume the carriage 2 is moved to a position "A" on the supporting arm 3a. In this position, the brushes 57 and 308 would energize the appropriate millimeter and centimeter contacts 51 and 308, respectively, and the appropriate values will light up in the indicator tubes 54 and 56. This will be so if the discs 71 and 73 are in their normal positions so that the bridges 74 will connect the read-in contact with the pertaining read-out contact on disc 70 so that a read-in value of "3," for example, may be read out and record as a 3 on tube 54.

The position "A" referred to above represents a position "M" as shown in FIGURE 1. At position "A" a zero adjustment may be made which causes the indicator tubes 54 and 56 to read zero. This is accomplished by turning the discs 71 and 73.

If the disc 71 is rotated in a clockwise direction as shown in FIGURE 10, an arbitrary contact 51 will be connected to the zero cathode of tube 54. In the example above, if disc 71 is rotated three positions in a clockwise direction, from the normal position shown in FIGURE 10, a read-in pole 3 will be connected with read-out pole zero by the bridge means 74. All the other read-in poles will be shifted by three units also, so that the read-in pole 4, for example, will be read-out as a "1." The zero setting of the centimeter contacts 309 can be done in a similar manner by rotating disc 73 if necessary.

As shown in FIGURES 9 and 10, disc 70 and disc 307 have a plurality of teeth thereon which mesh with gear 65. Gear 65 is connected to gear 64 which may be connected to the correction device shown in FIGURE 7 through a suitable transmission arrangement (not shown). The camber and pivot inclination device shown in FIGURE 7 will then turn gear 64 which in turn will rotate discs 70 and 307'. Disc 71 which is fixed to rotate with disc 307" will remain stationary after being rotated the three positions as previously explained in an example.

As the correction unit of FIGURE 7 determines the tilting of sliding carriage 2 and determines the number of units of correction as previously explained, disc 70 which is operatively connected therewith will be rotated the corresponding number of correction units. As a consequence, the number of correction units will light up in the number indicating tube 54. Rows of diodes 320 and 321 prevent all the numbers of the tube 54 from lighting up at the same time.

In the above example, if 2 correction units were necessary, the disc 70 would be rotated 2 positions while disc 71 would remain stationary. In rotating, the read-in pole 3 on disc 70 would be rotated to a position where one of the bridges 74 on disc 71 would connect it with read-out pole 2 on disc 70 and cause the number 2 on the indicator tube 54 to be lighted.

In order to coordinate the indicated millimeter values with the centimeter values for the change of the numerals "9" and "0" at the indicator tube 54 when a zero setting is being done or when a zero setting has been made and corrective values are being fed into the set-up shown in FIGURE 7, the following construction is used.

Disc 307' has ten contacts 0 to 9 distributed over half its circumference as shown in FIGURE 11. There is also a contact 0' on disc 307', which contact is located diametrically opposite from contact 9. The contacts 0 to 9 are connected to the pertaining cathode of millimeter indicator tube 54. Contact 0' is connected to brush 308', which brushes across the lower group of centimeter contacts 309'.

Disc 307" which is adjacent to disc 307' is fixed to rotate with disc 71 as shown in FIGURE 9. Disc 307" carries two bridges 311' and 311" thereon which are shown in FIGURE 11. When disc 307" is in the normal position as shown in FIGURE 11, the bridge 311' engages the contacts 0 to 9 of disc 307' to connect the contacts with one another. Bridge 311' is connected to the brush 308 which slides across the upper staggered row of centimeter contacts 309.

Bridge 311" on disc 307" engages only contact 0' of disc 307' when disc 307" is in the normal position shown in FIGURE 11. Contact 0' of disc 207' is connected to brush means 308' which is positioned on sliding carriage 2 to slide over the lower staggered row of centimeter contacts 309'. In the normal position of disc 307" shown in FIGURE 11, the bridge 311" will not carry any current since it is not connected to any of the contacts 0–9 on disc 307'.

When the sliding carriage 2 is moved along support arm 3a, brush means 308 will first slide across the upper row of centimeter contacts 309 and will first slide over centimeter contact "0," then over contact "1," etc., and will accordingly cause the pertaining numbers in indicator tube 56 to become lighted. Because the contact "0" on disc 307" carries no current, the lower row of centimeter contacts 309 remains inactive while disc 307" remains in the normal position.

Assume that the sliding carriage has been moved along the support arm 3a to position "A" shown in FIGURE 11 and the number 3 appears in the millimeter tube 54. If one performs a zero setting in this position, disc 71 and 307" which are joined together will rotate three positions, so that the bridge means 74 on disc 71 will now cause the read-in pole "3" on disc 70 to be connected to read-out pole "0" on disc 70. The current from millimeter contact 3 of contacts 51 will now light up to the 0 in tube 54, thereby effecting a zero adjustment.

Disc 307" has also been rotated with disc 71 during the zero adjustment so now the bridges 311' and 311" will assume the position in relation to contacts 0 to 9 and 0' on disc 307', as shown in FIGURE 12. In this rotated position, bridge 311' on disc 307" will connect together the contacts 3 to 9 on disc 307', while the bridge 311" will connect together the contacts 0 to 2 and contact 0' on disc 307'.

The contacts 0 to 2 as well as the contact 0' are connected with brush 308' across bridge 311". The bridge 311 obtains current when the numbers 0 to 6 of the indicator tube 54 are run over which correspond to the contacts 3 to 9 of disc 307'. A potential is thereby placed on the zero cathode of centimeter indicator tube 56 by the path which goes through contact 309, across brush means 308, and the centimeter contact (0) of the upper row of contacts 309.

When running over the numbers 7, 8, and 9 of the indicator tube 54, which correspond to the contacts 0, 1, and 2 of disc 307', the bridge 311" becomes free of current and voltage is now applied to the bridge 311". With current in bridge 311", the zero cathode of tube 56 again receives current from the path going from contact 0', to brush means 308', and the centimeter contact 0 of the row 309.

When the sliding carriage runs over the position indicated by B in FIGURE 11, the bridge 311 again receives current from one of the contacts 3 to 9. The coordinated brush means 308 is also located over field 1 of the row of contacts 309 so that the number "1" will light up in the indicator tube 54.

The above construction guarantees that independently of the momentary cordination of the contacts 51 to the cathodes of the tube 54 brought about by the switch 62, the proper numeral (either higher or lower) will light up in centimeter indicator tube 56 when there is a changeover of numerals "0" to "9" in the millimeter indicator tube 54.

It will be understood that this invention is susceptible to modification in order to adapt it to different usages and coniditions and accordingly, it is desired to comprehend such modifications within this invention as may fall within the scope of the appended claims.

What is claimed is:

1. In a machine having a yieldable supporting member and tool holding means which is adapted to slide over said supporting member, the improvement comprising an electrically operated correction device for indicating the tilting of said tool holding means on said supporting member and comprising; indicator means for indicating the position of said tool holding means on said supporting member, and correction means mounted on said tool holding means to sense the tilting thereof and to produce correction impulses and to act automatically upon said indicator means whereby the corrected value may be read out at said indicator means.

2. The device as claimed in claim 1 in which said correction device further comprises adjustable means for varying the said number of correction impulses in order to adapt the correction device for different heights of the tool holder means above a workpiece in said machine.

3. The device as claimed in claim 2 further comprising zero adjustment means adapted to equate said indicator means to zero at each arbitrary position of said tool holding means on said supporting member.

4. The device as claimed in claim 3 further comprising selector means for selecting the machining height at which the tool holder means will be located above a workpiece in the machine in order that the correct number of correction impulses for the pertaining machining height will be supplied to said indicator means.

5. The device as claimed in claim 1 in which said correction device further comprises adjustable means for multiplying the number of correction units supplied by said means on said tool holder means.

6. The device as claimed in claim 1 in which said correction device further comprises adjustable means for dividing the number of correction units supplied by said means on said tool holder means.

7. The debice as claimed in claim 1 in which said correction means are operative to indicate the correction required in said indicator means to compensate for the tilting of said tool holder means at any piston on said supporting member.

8. The device as claimed in claim 1 in which said correction means comprises sensing means which sense the magnitude of the tilting of said tool holding means in an analog manner and means to convert the analog values from said sensing means to digital values which are fed into said indicator means.

9. The device as claimed in claim 8 in which said sensing means has a starting position and a second position which reflects the extent of tilting of said tool holder means, and further comprising follow-up device means which act upon said sensing means to restore it to said starting position with the amount of restoration necessary being a measure of the correction necessary, said follow-up indicator means also being adapted to act upon said indicator means for indicating the corrected value.

10. The device as claimed in claim 9 further comprising transmission means interconnecting said sensing means and said follow-up device means, said transmission means being adjustable to produce different transmission ratios.

11. The device as claimed in claim 10 in which said follow-up device means is a camber and pivot inclination device which is actuated at the adjusting of the transmission ratio of said transmission means.

12. The device as claimed in claim 11 in which sensing means comprise, two photoelectric cell means, optical means for producing equal light intensities in said cell means at said starting position, said optical means being further adapted to produce unequal light intensities in said cell means in response to a tilting of said tool holder means, and a part member actuated by said follow-up device means and adapted to restore equal light intensities in said cell means when said tool holder means is tilted.

13. The device as claimed in claim 12 in which said part member is shifted in response to a change in the transmission ratio of said transmission means to thereby influence the light intensities in said cell means.

14. The device as claimed in claim 13 in which the said transmission means interconnecting said sensing means and said follow-up device means includes at least one lever having a fulcrum which is adjustable for the purpose of changing the transmission ratio between said sensing means and said follow-up device means.

15. The device as claimed in claim 1 in which said indicator means further comprises counter means and said correction means is adaptable for supplying positive and negative correction impulses to said counter means.

16. The device as claimed in claim 15 further comprising electrical means for varying the number of correction impulses of said correction means in order to adapt the correction device for different machining heights of the tool holder means above a workpiece in said machine.

17. The device as claimed in claim 16 in which said means for varying the number of correction impulses comprises counting ring means for dividing the number of correction impulses and having a plurality of flip-flop circuits which are selectively brought into action.

18. The device as claimed in claim 17 in which said plurality of flip flop circuits are switched in series, multipolar switch means to which said flip flop circuits are connected, said correction impulses being fed into each said flip flop circuit, said multipolar switch means being effective to connect one of said flip flop circuits with said counter means.

19. The device as claimed in claim 18 further comprising double switch means, two AND gate means connected to the output of said double switch means, OR gate means receiving the output of said two AND gate means, said OR gate means being connected to said counter means, and flip flop circuit means interconnecting said two AND gate means with the output side of said OR gate means.

20. The device as claimed in claim 15 in which said electrical means for varying the number of correction impulses further comprises a plurality of impulse generating stages selectively operable for multiplying the said correction impulses.

21. The device as claimed in claim 15 further comprising, oscillator means for supplying a definite number of correction impulses, multivibrator means adapted to be actuated by said correction impulses, and circuits means interconnecting said oscillator means, multivibrator means and said counter means and adapted to send correction impulses from said oscillator means to said counter means when said multivibrator means is actuated.

22. The device as claimed in claim 21 in which said correction means further comprising means for changing the time constant of said multivibrator means so that the number of impulses from said oscillator means will be correlated to the pertaining machining height of the tool holder means above a workpiece in said machine.

23. The device as claimed in claim 21 in which the frequency of said oscillator means is adjustable and is correlated to the pertaining machining height of the tool holder means above a workpiece in said machine.

24. The device as claimed in claim 15 further comprising multivibrator means having an adjustable times constant, and means for adjusting the said time constant in correlation with the height of said tool holding means above a workpiece in said machine.

25. The device as claimed in claim 15 further comprising storage means for storing said correction impulses and means for varying the number of correction impulses received from said storage means in order to adapt the correction device for different heights of the tool holder means above a workpiece in said machine.

26. The device as claimed in claim 25 in which said correction impulses after being varied in number are transferred to said indicator means.

27. The device as claimed in claim 1 further comprising electrical contacts spaced on said supporting member in the form of a distance scale, at least one brush means on said tool holding means adapted to slide over said contacts and place a voltage thereon, said indicator means comprising number indicator tubes having a plurality of cathods, zero switch means connecting said electrical contacts with the pertaining cathods of the said pertaining number indicator tubes to indicate a value which corresponds to the position of said tool holding means on said supporting member, said zero switch means being adaptable to reverse the polarity selectively of said contacts with the cathodes of the pertaining number indicator tube for the purpose of making said number indicator tubes read zero at any position of the tool holder means on said supporting member, said correction means further comprising a follow-up device means which actuates at least one of said zero switch means so as to indicate the amounts of correction necessary in said number indicator tubes.

28. The device as claimed in claim 27 in which each said zero switch means further comprises at least a first disc means and a second disc means, a first group of poles mounted on said first disc means and connected to the cathodes of the pertaining number indication tube, a second group of poles mounted on said first disc means and connected to the pertaining contacts on said supporting member, bridge means mounted on said second disc member and adapted to always connect one of the poles of said first group with one of the poles of said second group, one of said first disc means being adaptable to be rotated by said follow-up device means so as to indicate the amount of correction necessary in said number indicator tubes.

29. The device as claimed in claim 27 in which said correction means further comprises sensing means comprising two photo electric cell means, optical means for producing equal light intensities in said cell means when said tool holding means is in an untilted position, said optical means being further adapted to produce unequal light intensities in said cell means in response to a tilting of said tool holder means, a pairt member actuated by said follow-up device means and adapted to restore equal light intensities in said cell means when said tool holder means is tilted, and adjusted transmission means interconnecting said sensing means and said follow-up device means for adapting said correction means for different machining heights.

30. The device as claimed in claim 29 in which said transmission means includes at least one lever having a fulcrum which is adjustable for the purpose of changing transmission ratio of said transmission means.

31. In a machine having a yieldable supporting member and tool holding means which is adapted to slide over said supporting member, the improvement consisting of an electrically operated correction device for indicating the tilting of said tool holder means on said supporting member and comprising; indicator means for indicating the position of said tool holder means on said supporting member, correction means mounted on said tool holding means to sense the tilting thereof and to produce correction impulses and to act automatically upon said indicator means whereby the corrected value may be read out at said indicator means, adjustable means for varying the said number of correction impulses in order to adapt the correction device for different heights of the tool holder means above a workpiece in said machine, and zero adjustment means adapted to equate said indicator means to zero at each arbitrary position of said tool holding means on said supporting member, said correction means further comprising a sensing member having a starting position and a second position which is influenced by gravity and which second position represents the tilting of said tool holding means, and means to return said sensing member to said first position.

32. The device as claimed in claim 31 in which said means to return said sensing member to said first position employs magnetic forces.

33. In a machine having a yieldable supporting member and tool holding means which is adapted to slide over said supporting member, the improvement consisting of an electrically operated correction device for indicating the tilting of said tool holder means on said supporting member and comprising; indicator means for indicating the position of said tool holding means on said supporting member, correction means mounted on said tool holding means to sense the tilting thereof and to produce correction impulses in response thereto, temperature correction means for determining shifting of said tool holder means due to temperature influence and to produce correction impulses therefor, and means to add both said correction impulses to produce a net correction in said indicator means.

References Cited

UNITED STATES PATENTS

| | | | |
|---|---|---|---|
| 3,007,096 | 10/1961 | Tripp | 235—151.11 XR |
| 3,079,522 | 2/1963 | McGarrell | 235—151.11 XR |
| 3,265,946 | 8/1966 | Johnson et al. | 318—18 |
| 3,308,279 | 3/1967 | Kelling | 235—151.11 |
| 3,271,279 | 9/1966 | Riddle | 318—489 |

MALCOLM A. MORRISON, *Primary Examiner.*

M. P. HARTMAN, *Assistant Examiner.*